United States Patent [19]

Keyes, IV

[11] Patent Number: 4,466,296
[45] Date of Patent: Aug. 21, 1984

[54] FORCE TRANSDUCER RANGE ADJUSTER

[75] Inventor: Marion A. Keyes, IV, Chagrin Falls, Ohio

[73] Assignee: The Babcock & Wilcox Company, New Orleans, La.

[21] Appl. No.: 394,956

[22] Filed: Jul. 2, 1982

[51] Int. Cl.$^3$ ............................................... G01L 1/22
[52] U.S. Cl. ................................. 73/862.52; 73/862.65
[58] Field of Search ........... 73/862.62, 862.64, 862.65, 73/862.66, 862.52; 338/5; 177/229

[56] References Cited

U.S. PATENT DOCUMENTS

| | | | |
|---|---|---|---|
| 2,681,566 | 6/1954 | Ruge | 73/862.52 |
| 4,280,363 | 7/1981 | Johansson | 73/862.65 |
| 4,300,645 | 11/1981 | Sly et al. | 177/229 |

Primary Examiner—Gerald Goldberg
Assistant Examiner—John E. Chapman, Jr.
Attorney, Agent, or Firm—Vytas R. Matas; Robert J. Edwards

[57] ABSTRACT

A force transducer for producing an output signal proportional to the magnitude of an input force having a force receiving base cantilevered from a fixed base through a leaf spring flexure assembly which is provided with means for anchoring the opposite ends of a removable spring flexure in the fixed and force receiving bases respectively to thereby adjust the transducer to a predetermined force range.

4 Claims, 2 Drawing Figures

FORCE TRANSDUCER RANGE ADJUSTER

This invention relates to a transducer for generating an output signal corresponding to the magnitude of an input force. The input force is applied through a force receiving base to which the free end of a leaf spring flexure is anchored and the other end of which is anchored in a fixed base. A force applied to the force receiving base causes the leaf spring flexure to bend about the fixed base. The output signal is generated by measuring the strain in the leaf spring flexure by means of one or more strain gages bound to or diffused on one or more surfaces of the leaf spring flexure. A force transducer of this general type is illustrated and described in U.S. Patent Application Ser. No. 06/309,635, filed Oct. 8, 1981.

The span of force ranges within which a transducer, as described, can be calibrated is materially limited. To obtain acceptable resolution and accuracy while avoiding over-stressing the leaf spring flexure, displacement of the free end thereof must be constrained to be within narrow limits. To cover the span of force ranges found in industrial applications, a multiplicity of leaf spring flexures must therefore be available and the calibration of a specific leaf spring flexure for a designated force range obtained by adjusting its thickness or other physical dimension. In contrast to this, and as an objective, this invention comprehends a force transducer wherein the span of force ranges within which the transducer can be calibrated is expanded by a compound flexure unit incorporating both a leaf-spring flexure and an auxiliary calibrating spring flexure.

A further objective of this invention is to provide a compound flexure unit provided with means whereby a calibrating spring flexure may be easily removed from or anchored in place in the compound flexure unit.

A further objective of this invention is to provide a compound flexure unit adapted to receive calibrating spring flexures having different spring rates whereby the flexure unit is readily adjusted to constrain the displacement of the leaf spring flexure within predetermined limits for a greatly expanded span of maximum input force.

These and other objectives of this invention will be apparent as the description proceeds in connection with the drawings, in which:

IN THE DRAWINGS

DETAILED DESCRIPTION

Figure 1:
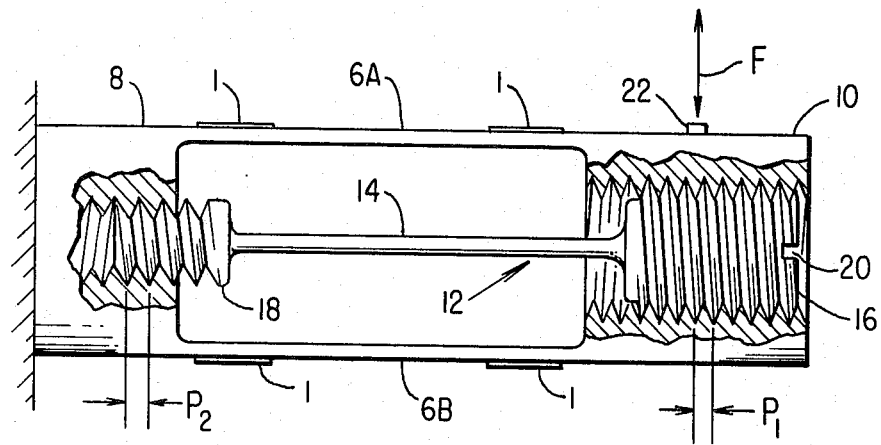
FIG. 1 is a partially sectioned side elevation of an embodiment of this invention.
Figure 2:
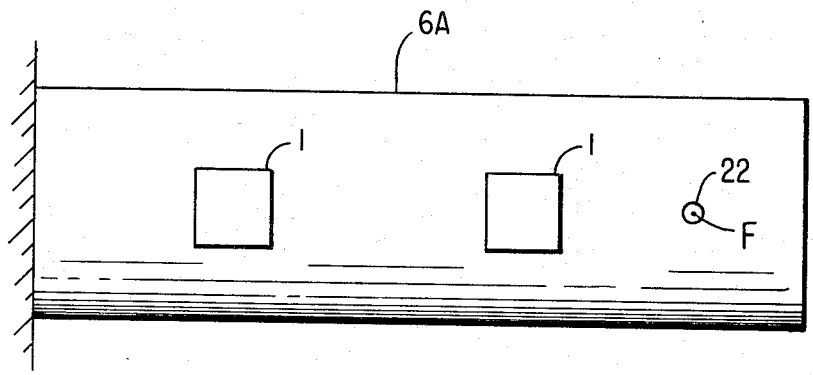
FIG. 2 is a top plan view of the embodiment of this invention illustrated in FIG. 1.

Referring now to the drawings in which like reference characters designate like or corresponding parts there is shown a force transducer comprised of spaced apart parallel leaf spring flexures 6A and 6B, each having one end anchored in and cantilevered from a fixed base 8 and the other end anchored in and cantilevered from a force receiving base 10. An input force F to a projection 22 on the base 10, normal to the flexures 6A and 6B, causes a proportional linear displacement of the base 10 and places the faces of the flexures 6A and 6B partly in compression and partly in tension. To generate an output signal corresponding to the strain produced by an input force F there may be bonded to or diffused on the surfaces of the flexures one or more strain gages such as shown at 1 which may be incorporated in any one of known suitable readout circuits (not shown).

To obtain acceptable resolution and accuracy, while avoiding over-stressng the flexures 6A and 6B, the displacement of the free ends of the flexures, i.e., of the force receiving base 10, at a maximum applied force F must be constrained to be within predetermined narrow limits. Thus to satisfy the needs of the wide variety of force transducer applications it is necessary to have a multiplicity of transducers available.

To avoid the need for a multiplicity of transducers, there is provided a removable auxiliary spring flexure generally indicated at 12 provided with a relatively small diameter flexure section 14 and threaded end sections 16 and 18 engaging the threads formed in bores in the force receiving base 10 and fixed base 8 respectively. The auxiliary spring flexure may be provided with a screwdriver slot 20 so that it may be readily inserted in or removed from the flexure unit by means of a screwdriver. The threads on the end section 16 have a slightly smaller pitch than the threads on the end section 18 which, when the auxiliary flexure is driven home, both preload and rigidly anchor it in the fixed base space 8 and force receiving base 10. Accordingly a single force transducer may be used to cover a wide span of input force ranges by the insertion in the transducer of an auxiliary spring flexure 12 having a spring rate supplementing that of the flexures 6A and 6B to maintain the displacement of the force receiving base within the predetermined limits for any specific input force range.

I claim:

1. In a force transducer for generating an output signal corresponding to the magnitude of a force having a force receiving base cantilevered from a fixed base through a spring flexure having a spring rate producing a given displacement of the force receiving base by an applied force of given magnitude, means for expanding the force range of the transducer comprising a removable auxiliary spring flexure spaced from but disposed in parallel relationship to said first spring flexure and having thread means at each end for anchoring the opposite ends of said auxiliary spring flexure in said fixed and force receiving bases respectively whereby the displacement of the force receiving base is substantially the same as for said given displacement for an applied force of greater magnitude than said first applied force.

2. In a force transducer as set forth in claim 1 wherein said auxiliary spring flexure is comprised of a rod having a center section of relatively small cross-sectional area and end segments of greater cross-sectional area.

3. In a force transducer as set forth in claim 2 wherein the opposite end sections of said auxiliary spring flexure are provided with screw threads of different pitch.

4. In a force transducer as set forth in claim 3 wherein the means for anchoring the opposite ends of said auxiliary spring flexure in said fixed and force receiving bases comprise bores in the fixed and force receiving bases, the bore in one base having a screw thread adapted to engage the screw thread on one end section of the auxiliary flexure spring and the bore in the other base having a screw thread adapted to engage the screw thread on the other end section of the auxiliary spring flexure.

* * * * *